(12) United States Patent
Batoz et al.

(10) Patent No.: US 7,901,504 B2
(45) Date of Patent: Mar. 8, 2011

(54) CONCRETE COMPOSITIONS

(75) Inventors: Jean-François Batoz, Paris (FR); Mouloud Behloul, Chaville (FR); Philippe Fonollosa, Cremieu (FR)

(73) Assignee: Lafarge, Paris (FR)

( * ) Notice: Subject to any disclaimer, the term of this patent is extended or adjusted under 35 U.S.C. 154(b) by 25 days.

(21) Appl. No.: 12/522,295

(22) PCT Filed: Jan. 23, 2008

(86) PCT No.: PCT/IB2008/001359
§ 371 (c)(1),
(2), (4) Date: Jul. 7, 2009

(87) PCT Pub. No.: WO2008/090481
PCT Pub. Date: Jul. 31, 2008

(65) Prior Publication Data
US 2010/0043673 A1    Feb. 25, 2010

(30) Foreign Application Priority Data
Jan. 24, 2007   (EP) ..................................... 07368002

(51) Int. Cl.
C04B 14/38    (2006.01)
(52) U.S. Cl. .......................... 106/644; 106/713; 106/737

(58) Field of Classification Search .................. 106/644, 106/713, 737
See application file for complete search history.

(56) References Cited

FOREIGN PATENT DOCUMENTS

| | | |
|---|---|---|
| EP | 0 744 387 B1 | 3/1999 |
| FR | 2 866 330 | 8/2005 |
| JP | 2000-247713 | 9/2000 |
| JP | 2001-240455 | 9/2001 |
| WO | WO 03/043947 | 5/2003 |
| WO | WO 2005/077857 | 8/2005 |
| WO | WO 2006/027645 | 3/2006 |
| WO | WO 2006/122976 | 11/2006 |
| WO | WO 2006/134080 | 12/2006 |

*Primary Examiner* — Paul Marcantoni
(74) *Attorney, Agent, or Firm* — Pillsbury Winthrop Shaw Pittman, LLP

(57) ABSTRACT

A concrete which includes in parts by weight: 100 Portland cement; 50 to 200 of a sand having a single grading with a D10 to D90 between 0.063 and 5 mm, or a mixture of sands, the finest sand having a D10 to D90 between 0.063 and 1 mm and the coarsest sand having a D10 to D90 between 1 and 4 mm; 10 to 50 of a particulate, substantially non-pozzolanic material having a mean particle size less than 15 μm; 0.1 to 10 of a water-reducing superplasticizer; and 10 to 30 of water; which concrete is substantially free of silica fume; the concrete having a compressive strength greater than 100 Mpa at 28 days.

12 Claims, No Drawings

CONCRETE COMPOSITIONS

CROSS-REFERENCE TO RELATED APPLICATIONS

This is the U.S. National Stage of PCT/IB2008/001359, filed Jan. 23, 2008, which in turn claims priority to European Patent Application No. 07368002.7, filed Jan. 24, 2007, the entire contents of both applications are incorporated herein by reference in their entireties.

FIELD

This invention relates to new concrete compositions and their use.

BACKGROUND

Silica fume has been known as an additive in cements since the 1980s. Since then the extent of its use has grown and it is now generally regarded as an indispensable material in the production of high performance concrete (HPC), particularly ultra high performance concrete (UHPC) if properties, such as compressive strength, adequate for use in modern construction methods are to be secured.

High performance concrete generally has a compressive strength at 28 days of 50 to 100 MPa. Ultra high performance concrete generally has a compressive strength at 28 days greater than 100 MPa and generally greater than 120 MPa.

Silica fume, also known as micro-silica, is a by-product in the production of silicon or ferrosilicon alloys. Its main constituent is amorphous silicon dioxide. Individual particles generally have a diameter of about 5 to 10 nm. Individual particles agglomerate to form 0.1 to 1 μm agglomerates and then aggregate together into 20 to 30 μm aggregates. Silica fume generally has a BET surface area of 10-30 m$^2$/g. It is known as a reactive pozzolanic material.

A pozzolan is described in Lea's Chemistry of Cement and Concrete, 4th edition, published by Arnold as an inorganic material, natural or synthetic, which hardens in water when mixed with calcium hydroxide (lime) or with a material which can release calcium hydroxide (such as Portland Cement clinker). A pozzolan is generally a siliceous or siliceous and aluminous material which, alone, possesses little or no cementitious value but which is capable, in the presence of moisture, of reacting chemically with calcium hydroxide at ambient temperature to form compounds having cementitious properties.

It will be understood, therefore, that silica fume takes an active part in the setting process of concrete mixes containing it and is actively involved in the formation of cementitious compounds which bind together the various particulate materials present and thereby contribute to the strength of the resulting concrete.

WO 2005/077857 describes a very high performance concrete which comprises a mixture of calcined bauxite sands of different granulometries and silica fume in which ultra fine calcium carbonate having defined specific surface values (greater than 10 m$^2$/g) and form index (at least 0.3, where the form index is the ratio of particle thickness to particle length, measured by field effect scanning electron microscopy) is added in order to improve the whiteness of the concrete. The mean diameter of the ultra-fine particles of calcium carbonate is about 70 nm.

WO 2006/134080 A1 describes the use of calcium carbonate particles in the production of construction materials such as plaster, stucco, cement render, mortar and concrete having improved properties. The improved properties described include good sound absorption properties and high abrasion resistance but do not include compression resistance.

SUMMARY

The present invention seeks to replace substantially all of the pozzolanic silica fume in concrete by non-pozzolanic material whilst maintaining desirable properties and combinations thereof; such properties include compressive strength; the invention seeks to provide high performance, especially ultra high performance concrete having, for example, adequate compression resistance despite the lack of silica fume. The invention also seeks to provide concrete having a shorter setting time.

DETAILED DESCRIPTION

The present invention accordingly provides a concrete which comprises in relative parts by weight:
100 of Portland cement;
50 to 200 (preferably 80 to 170, more preferably 100 to 150) of a sand having a single grading with a D10 to D90 between 0.063 and 5 mm, or a mixture of sands (preferably two sands), the finest sand having a D10 to D90 between 0.063 and 1mn and the coarsest sand having a D10 to D90 between 1 and 4 mm;
10 to 80 (preferably 10 to 50, for example 20 to 40) of a particulate substantially non-pozzolanic material having a mean particle size less than 15 μm;
0.1 to 10 of a water-reducing superplasticizer; and
10 to 30 of water;
which concrete is substantially free of silica fume;
the said concrete having a compressive strength greater than 100 MPa at 28 days.

The compressive strength of 100 MPa is generally achieved with or without thermal curing. Thermal curing is preferred to develop greater strength. The compressive strength is preferably greater than 120 MPa, more preferably greater than 150 MPa.

The sand is generally a silica or limestone sand, a calcined bauxite or a particulate metallurgical residue; the fine sand may also comprise a ground hard dense mineral material, for example a ground vitrified slag. A preferred mixture of sands comprises a mixture of sands (preferably two sands), the finest sand having a D10 to D90 between 0.063 and 1 mm and the coarsest sand having a D10 to D90 between 1 and 2 mm.

The concrete according to the invention is preferably a self-placing concrete. It preferably has a Vicat setting time from 2 to 16 hours, for example from 4 to 8 hours. HPC and UHPC generally exhibit higher shrinkage on setting due to their higher cement content. The total shrinkage may be reduced by the inclusion, generally of 2 to 8, preferably 3 to 5, for example about 4 parts, of quicklime, burnt lime or calcium oxide in the mixture before addition of water.

The substantially non-pozzolanic material (hereinafter referred to as the non-pozzolan) preferably has a mean particle size of less than 10 μm, for example less than 8 μm, preferably less than 5 μm, for example 1 to 4 μm. The mean particle size is generally greater than 0.1 μm.

The non-pozzolan may be a particulate calcium carbonate-containing material (for example particulate calcium carbonate such as ground limestone or precipitated calcium carbonate). It is preferably a ground calcium carbonate. The ground calcium carbonate may be, for example, Durcal® 1.

The non-pozzolan may be a ground quartz, for example C800 which is a substantially non-pozzolanic silica filler available from Sifraco, France.

The preferred BET surface area (determined by known methods) of the non-pozzolan, for example ground calcium carbonate or quartz, is 2-10 m²/g, generally less than 8 m²/g, for example 4 to 7 m²/g, preferably less than 6 m²/g.

Precipitated calcium carbonate (PCC) is also a substantially non-pozzolanic material. PCC is available in a variety of particle sizes and crystalline forms (for example calcite or aragonite which may be rhombohedral, acicular or scalenohedral). For example PCC having a particle size greater than 1 μm, preferably scalenohedral in form, may be used (such as medium PCC available from Specialty Minerals Inc (SMI) which has a median particle size of 1.4 to 3 μm and is scalenohedral).

PCC having a particle size less than 1 μm, for example 0.3 to 0.7 μm, may also be used (fine PCC having a median particle size of 0.3 to 0.7 μM is available from Solvay).

Ultra-fine PCC (sometimes referred to as nano PCC) having, for example, a particle size less than 0.07 μm may be used. In ultra-fine PCC individual (primary) particles may have a particle size of about 20 nm. Individual particles agglomerate into clusters having a (secondary) size of about 0.1 to 1 μm. The clusters themselves form agglomerates having a (ternary) size greater than 1 μm.

When ultra-fine PCC having a particle size of, for example, less than 0.07 μm, is used it is preferably acicular or scalenohedral; the form index is preferably less than 0.3, preferably less than 0.2, for example 0.2 to 0.1. Examples include acicular aragonite or scalenohedral calcite, generally having a mean particle size from 200 to 350 nm, preferably with a specific surface of 6 to 10 m²/g (e.g. Socal products available from Solvay).

A non-pozzolan or a mixture of non-pozzolans may be used, for example ground limestone, ground quartz or precipitated calcium carbonate or a mixture thereof.

The shortened setting time in the concrete according to the invention is in comparison with a similar concrete containing silica flume instead of non-pozzolan.

The concrete according to the invention is generally used in association with strengthening means, for example metal and/or organic fibres and/or other strengthening elements described hereinafter.

The compositions of the invention preferably comprise metal and/or organic fibres.

The amount by volume of fibres is generally from 0.5 to 8% relative to the volume of the set concrete. The amount of metal fibres, expressed in terms of the volume of the final set concrete is generally less than 4%, for example from 0.5 to 3.5%, preferably about 2%. The amount of organic fibres, expressed on the same basis, is generally from 1 to 8%, preferably 2 to 5%. When such fibres are included the concrete according to the invention is preferably an ultra high performance concrete: such concretes preferably have a compressive strength greater than 120 MPa, for example greater than 140 MPa.

Metal fibres are generally chosen from steel fibres, such as high strength steel fibres, amorphous steel fibres or stainless steel fibres. Optionally, the steel fibres may be coated with a non-ferrous metal such as copper, zinc, nickel (or their alloys).

The individual length (1) of the metal fibres is generally at least 2 mm and is preferably 10-30 mm. The l/d ratio (d being the diameter of the fibres) is generally from 10 to 300, preferably 30 to 300 and more preferably 30 to 100.

Fibres having a variable geometry may be used: they may be crimped, corrugated or hooked at the ends. The roughness of the fibres may also be varied and/or fibres of variable cross-section may be used; the fibres may be obtained by any suitable technique, including by braiding or cabling several metal wires, to form a twisted assembly.

Bonding between the fibres and matrix may be promoted by several means, which may be used individually or in combination.

The bonding of the metal fibres in the cementitious matrix may be promoted by treating the surface of the fibres. This fibre treatment may be carried out by one or more of the following processes: fibre etching; or deposition of a mineral compound on the fibres, especially by depositing silica or a metal phosphate.

The etching may be carried out, for example, by contacting the fibres with an acid, followed by neutralization.

Silica may be deposited by contacting the fibres with a silicon compound, such as a silane, a siliconate or a silica sol. It will be understood that the silica or phosphate is then substantially confined to the surface of the metal fibres in the concrete matrix and is not uniformly dispersed in the matrix.

Phosphatizing treatments are known and are described, for example, in the article by G. LORIN entitled "The Phosphatizing of Metals" (1973), Pub. Eyrolles.

In general, a metal phosphate is deposited using a phosphatizing process, which comprises introducing prepickled metal fibres into an aqueous solution comprising a metal phosphate, preferably manganese phosphate or zinc phosphate, and then filtering the solution in order to recover the fibres: the fibres are then rinsed, neutralized and rinsed again. Unlike in the usual phosphatizing process, the fibres obtained do not have to undergo grease-type finishing; they may, however, optionally be impregnated with an additive either in order to provide anticorrosion protection or to make it easier for them to be processed with a cementitious medium. The phosphatizing treatment may also be carried out by coating or spraying a metal phosphate solution onto the fibres.

When metal fibres are present in the composition of the invention a viscosity modifying agent (e.g. Kelco-Crete, an anionic polysaccharide, from CP Kelco) is preferably used to prevent or reduce a lack of homogeneity in the fibre distribution due to settling out of the fibres.

Organic fibres include polyvinyl alcohol fibres (PVA), polyacrylonitrile fibres (PAN), polyethylene fibres (PE), high density polyethylene fibres (HDPE), polypropylene fibres (PP), homo- or copolymers polyamide or polyimide fibres. Mixtures of these fibres can also be used. The organic reinforcing fibres used in the invention may be classified as: high modulus reactive fibres, low modulus non-reactive fibres and reactive fibres. The term "modulus" as used in this specification including the accompanying claims, refers to Young's modulus (modulus of elasticity).

A mixture of metal and organic fibres may also be used: a "hybrid" composite, comprising fibres of various natures and/or lengths, is thereby obtained the mechanical behaviour of which may be adapted depending upon the required performance.

The presence of organic fibres makes it possible to modify the behaviour of the concrete to heat or fire.

Melting of organic fibres makes it possible to develop pathways through which steam or water under pressure can escape when the concrete is exposed to high temperatures.

The organic fibres may be present as a monostrand or multistrand; the diameter of the mono- or multistrand is preferably from 10 μm to 800 μm. The organic fibres may also be used in the form of woven or non-woven structures or of a hybrid strand comprising a different filament.

The individual length of the organic fibres is preferably 5 mm to 40 mm, more preferably 6 to 12 mm; the organic fibres are preferably PVA fibres.

The optimum quantity of organic fibres used generally depends on the fibre geometry, their chemical nature and their intrinsic mechanical properties (e.g. elastic modulus, flowing threshold, mechanical strength).

The l/d ratio, d being the fibre diameter and l the length, is generally from 10 to 300, preferably 30 to 90.

The use of blends of fibres having different properties permits modification of the properties of the concrete containing them.

Adherence of polymeric fibre to a concrete matrix may be promoted by various methods used alone or in combination. Adherence is promoted by using reactive fibres: adherence can be enhanced by thermal treatment of the concrete, for example by curing. Adherence can also be promoted by surface treatment of the fibres.

The ratio R of the average length L of the fibres to the grain size D of the sand is generally at least 5, particularly when the sand has a maximum grain size of 1 mm.

The cement in the concrete of the invention is generally a grey or white cement containing little or no silica fume so that the concrete is substantially free of silica fume. Suitable cements are the silica fume-free Portland cements described in Lea's Chemistry of Cement and Concrete. The Portland cements include slag: pozzolana; fly ash; burnt shale; limestone; and composite cements (the composite cements containing little or no silica fume). A preferred cement for use in the invention is CEM 1 (generally PMS).

White cement is preferred for the production of architectural materials and for mouldings such as furniture and sculpture in which the appearance of the material may be important. The absence of silica fume, which may impart a grey appearance (silica fume may be white or grey), and the use of white non pozzolans, allows the production of materials of good appearance. Such architectural materials may comprise glass or plastics fibres which do not detract from the whiteness of the appearance.

For structural applications where the colour and appearance is not so important metal fibres and, for example, grey cement may be used.

The water/cement weight ratio of the composition according to the invention may vary if cement substitutes are used, more particularly pozzolanic materials. The ratio is defined as the weight ratio of the water amount to the added weight of the cement and any pozzolans: it is generally from about 8% to 25%, preferably from 13% to 25%. The water/cement rate may be adjusted using, for example water-reducing agents and/or superplasticizers.

In the Concrete Admixtures Handbook, Properties Science and Technology, V. S. Ramachandran, Noyes Publications, 1984:

A water reducer is defined as an additive which reduces the amount of mixing water of concrete for a given workability by typically 10-15%. Water reducers include, for example lignosulphonates, hydroxycarboxylic acids, carbohydrates, and other specialized organic compounds, for example glycerol, polyvinyl alcohol, sodium alumino-methyl-siliconate, sulfanilic acid and casein.

Superplasticizers belong to a new class of water reducers chemically different from the normal water reducers and capable of reducing water contents by about 30%. The superplasticizers have been broadly classified into four groups: sulphonated naphthalene formaldehyde condensate (SNF) (generally a sodium salt); or sulphonated melamine formaldehyde condensate (SMF); modified lignosulfonates (MLS); and others. More recent superplasticizers include polycarboxylic compounds such as polyacrylates. The superplasticizer is preferably a new generation superplasticizer, for example a copolymer containing polyethylene glycol as graft chain and carboxylic functions in the main chain such as a polycarboxylic ether. Sodium polycarboxylate-polysulphonates and sodium polyacrylates may also be used. The amount of superplasticizer required generally depends on the reactivity of the cement. The lower the reactivity the lower the amount of superplasticizer required. In order to reduce the total alkali content the superplasticizer may be used as a calcium rather than a sodium salt.

Other additives may be added to the composition according to the invention, for example, a defoaming agent (e.g. polydimethylsiloxane). These also include silicones in the form of a solution, a solid or preferably in the form of a resin, an oil or an emulsion, preferably in water. More particularly suitable are silicones comprising (RSiO0.5) and (R2SiO) moieties.

In these formulae, the R radicals, which may be the same or different, are preferably hydrogen or an alkyl group of 1 to 8 carbon atoms, the methyl group being preferred. The number of moieties is preferably from 30 to 120.

The amount of such an agent in the composition is generally at most 5 parts in weight relative to the cement.

The concrete may be prepared by known methods, including mixing the solid components and water, shaping (moulding, casting, injection, pumping, extrusion, calendering), and then hardening.

They can also exhibit a compression strength $R_c$ of at least 120 MPa

The cement composition may comprise a reinforcing agent with an anisotropic shape and an average size of 1 mm at the most, preferably 500 µm at the most. The reinforcing agents generally have a platelet shape.

The amount of reinforcing agent is preferably 2.5% and 35%, generally 5-25% by volume of the sand and non-pozzolan.

By the size of the reinforcing agent is meant the average size of their largest dimension.

The agents may be natural or synthetic products.

The reinforcing agents as platelets may be selected amongst mica platelets, talc platelets, composite silicate platelets (clays), vermiculite platelets, alumina platelets.

It is possible to use a blend of reinforcing agents in the concrete composition according to the invention.

The reinforcing agents may comprise on the surface a polymeric organic coating comprising a material selected from: polyvinyl alcohol, silanes, siliconates, siloxane resins or polyorganosiloxanes or reaction products between (i) at least one carboxylic acid containing 3 to 22 carbon atoms, (ii) at least one polyfunctional aromatic or aliphatic amine or a substituted amine, containing 2 to 25 carbon atoms and (iii) a cross-linking agent which is a hydrosoluble metal complex, containing at least a metal selected from zinc, aluminium, titanium, copper, chromium, iron, zirconium and lead, for example as described in EP-A-0372804.

The coating thickness is generally from 0.01 µm to 10 µm, preferably from 0.1 µm to 1 µm.

Latexes include styrene-butadiene latexes, acrylic latexes, styrene-acrylic latexes, methacrylic latexes, carboxylated and phosphonated latexes. The latexes having calcium complexing functions are preferred.

A polymer organic coating can be obtained by treatment of the reinforcing agents in a fluidized bed or using a mixer of FORBERG type in the presence of one of the above-defined compounds.

Preferred compounds include H240 polyorganosiloxane, Rhodorsil 878, 865 and 1830 PX siloxane resins, 403/60/WS and WB LS 14 Manalox, all marketed by RHODIA Chimie, potassium siliconates.

Such a treatment is preferred for reinforcing agents which are natural products.

In order to prepare the concrete according to the invention the constituents and reinforcing fibres, when they are to be included are mixed with water. The following order of mixing may, for example, be adopted: mixing of the pulverulent constituents of the matrix (for example for 2 minutes); introduction of the water and a fraction, for example half, of the admixtures; mixing (for example for 1 minute); introduction of the remaining fraction of the admixtures; mixing (for example for 3 minutes); introduction of the reinforcing fibres and the additional constituents; mixing (for example for 2 minutes).

The concrete may be subjected to a thermal cure to improve its mechanical properties. Curing is generally conducted at a temperature from ambient temperature (e.g. 20° C. to 90° C.), preferably from 60° C. to 90° C. The curing temperature should be less than the boiling point of water at the ambient pressure. The curing temperature is generally less than 100° C. Autoclaving in which curing is conducted at elevated pressures allows higher curing temperatures to be used.

The cure time may be, for example, 6 hours to 4 days, preferably about 2 days. Curing is started after setting, generally at least one day after setting has started and preferably on concrete which is 2 days up to about 7 days old at 20° C.

The cure may be performed in dry or wet conditions or in cycles alternating both environments, for example, a 24 hour cure in a humid environment followed by a 24 hour cure in a dry environment.

The inclusion of quartz powder in the concrete composition is advantageous when the concrete is to be cured at a high temperature.

Strengthening means used in association with the concrete according to the invention also include the following.

The concrete may be pretensioned, by bonded wires or by bonded tendons, or post-tensioned, by single unbonded tendons or by cables or by sheaths or bars, the cable comprising an assembly of wires or comprising tendons.

Prestressing, whether in the form of pretensioning or in the form of post-tensioning, is particularly well suited to products made of the concrete according to the invention.

Metal prestressing cables have a very high, under-used, tensile strength as the lower tensile strength of the matrix which contains them does not allow the dimensions of the concrete structural elements to be optimized.

It will be understood that the strengthening means, including fibres, may be used singly or in combination.

The reduction in volume obtained, because of this increase in mechanical strength, allows the production of prefabricated elements. There is then the possibility of having long-span concrete elements that are easily transportable because of their lightness; this is particularly well suited to the construction of large structures in which the use of post-tensioning is widely employed. In the case of this type of structure, the solution provides particularly favourable savings to be made in terms of worksite duration times and assembly.

In addition, in the case of a thermal cure, the use of pretensioning or post-tensioning significantly reduces shrinkage.

They may also have a compressive strength $R_c$ of at least 150 MPa.

In mixing the components of the concrete according to the invention the particulate materials other than the cement may be introduced as pre-mixed dry powders or dilute or concentrated aqueous suspensions.

The particulate, substantially non-pozzolanic material in the concretes according to the invention is preferably substantially uniformly distributed throughout the concrete. The concrete according to the invention may: (a) contain substantially no bauxite, e.g. less than 5%, for example less than 2%, more preferably less than 1%, most preferably less than 0.5%, by weight relative to the weight of cement.

Unless otherwise specified, in this specification including the accompanying claims:
compressive strength values are measured after moist curing for 28 days at 20° C., on a cylindrical test sample having a diameter of 7 cm and a height of 14 cm;
flexural strengths are measured on prism-shaped test samples measuring 7×7×28 or 4×4×16 cm supported in 4-point flexure on an IBERTEST UMIB CO-300 class A machine;
the expression "substantially free of silica fume" means containing less than 5%, for example less than 2%, more preferably less than 1%, most preferably less than 0.5% by weight relative to the weight of cement;
percentages, unless otherwise specified, are by weight;
surface areas of materials are measured by the BET method using a Beckman Coulter SA 3100 apparatus with nitrogen as the adsorbed gas;
slump values (dynamic, with shocks—normally 20—at intervals of about 1 second, or static, without shocks) are measured on a circular shock table (diameter 300 mm, thickness 5.99 mm, weight about 4.1 kg) with a drop of about 12 mm. Test samples are prepared using a flattened conical mould, height 50 mm, top diameter 70 mm, bottom diameter 100 mm, according to ASTM C230; static values (before or without shocks) are measured after the sample has stopped moving after demoulding.
mean particle sizes and distributions of fine particles, for example the particulate non-pozzolan, e.g. calcium carbonate, are measured in aqueous dispersion by laser granulometry using a Malvern Mastersizer 2000 operated as follows: background noise is determined with laser power of at least 80%, to verify that a decreasing exponential curve is obtained, the sample is then measured using a concentration which produces an obscuration between 10 and 20%, pump speed 2000 rpm, stirrer speed 800 rpm, no ultrasonic agitation with measurement for 30 seconds and then, on the same sample with ultrasonic agitation using the following parameters: (a) initially, pump speed 2500 rpm, stirrer speed 1000 rpm, ultrasound 100% (30 watts) and, after 3 minutes (b) pump speed 200 rpm, stirrer speed 800 rpm, ultrasound 0%, allowing 10 seconds under operating conditions (b) measurement for 30 seconds
particle sizes less than 0.1 µm are generally measured using electron microscopy.

The invention is illustrated by the following non-limiting Examples. In the Examples materials used are available from the following suppliers:
(1) Cement HTS: Lafarge France Le Teil.
(2) 980 NS (silica fume): SEPR, France
(3) Ultrafume limestone filler Durcal 1: OMYA, France
  Durcal 1 has a BET value of about 5 m²/g and a mean particle size of about 2.5 µm.
(4) Limestone filler Durcal 5: OMYA, France
  Durcal 5 has a BET value of 2.10 m²/g and a mean particle size of about 7 µm.
(5) Sand Be01: S*ifraco*, *France*
(6) Superplaslicizer F2: Chryso, France
(7) PCC ARW200 (BET: 22.27 m²/g): Solvay, France
(8) White cement: Lafarge France Le Teil
(9) White FS MST: SEPR, France
(10) Siliceous filler Millisil® C400: Sifraco, France
  C400 has a BET value of 1.61 m²/g and a mean particle size of about 11 µm.
(11) Siliceous filler Sikron® C800: Sifraco, France
  CS800 has a BET value of 5.98 m²/g and a mean particle size of about 2.6 µm.
(12) Admixture A2: Chryso, France
(13) PVA fibres: Kuraray, Japan
(14) Kelco-Crete K400: CP Kelco, USA
(15) Metallic (steel) fibres: Sodetal, France
(16) PCC Socal P2 and P3: Solvya, France Example 1

A comparison was made between a silica fume-containing concrete (designated SFC) and a concrete (designated D1) having the following compositions:

|  | D1 | SFC |
|---|---|---|
| Cement HTS | 1 | 1 |
| 980 NS (silica fume) |  | 0.25 |
| Ultrafine limestone filler Durcal 1 | 0.3 |  |
| Limestone filler Durcal 5 | 0.3 | 0.3 |
| Sand Be01 | 1.37 | 1.37 |
| Superplasticizer F2 | 0.0365 | 0.0365 |
| W/C ratio | 0.225 | 0.225 | in which the silica fume was replaced by Durcal 1, a ground calcium carbonate. Steel fibres (diameter 0.175 mm, length 13 μm, Sodetal, France) were added in an amount to provide 2% by volume in the set concrete.

The powders were first mixed in a high shear rate mixer (Eirich) and the concrete mixture was then prepared in a Skako mixer.

The results obtained are shown in the following Table 1.

TABLE 1

| Setting time (beginning) | 4 h 35 | 6 hr 50 |
|---|---|---|
| Setting time (end) | 9 h 35 | 13 hr 50 |
| Spread before shocks (mm) | 265 | 275 |
| Spread after shocks (mm) | 295 | 290 |
| Compressive strength at 48 h (1) | 115 MPa | 108 MPa |
| Flexural strength at 48 h (3) | 13 MPa | 28 MPa |
| Compressive strength after thermal curing (2) | 165 MPa | 210 MPa |
| Flexural strength after thermal curing (4) | 14 MPa | 38 MPa |

(1) After moist curing for two days at 20° C., on a cylindrical test sample having a diameter of 7 cm and a height of 14 cm.
(2) After moist curing for two days at 20° C., and then moist curing for 2 days at 90° C. on a cylindrical test sample having a diameter of 7 cm and a height of 14 cm.
(3) After moist curing for two days at 20° C., on a prism-shaped test sample (7 × 7 × 28 cm).
(4) After moist curing for two days at 20° C., and then moist curing for 2 days at 90° C. on a prism-shaped test sample (7 × 7 × 28 cm).

Example 2

A comparison was made, using the procedure described in Example 1, between a mixture having the composition given below in which the silica fume was replaced by (a) a mixture of 20% by weight of precipitated calcium carbonate (PCC) and 80% of Durcal 1 and (b) 100% of PCC.

|  | 100% PCC | 20% PCC-80% D1 |
|---|---|---|
| Cement HTS | 1 | 1 |
| Ultrafine limestone filler Durcal 1 | — | 0.24 |
| PCC ARW200 | 0.299 | 0.0596 |
| Limestone filler Durcal 5 | 0.3 | 0.3 |
| Sand Be01 | 1.37 | 1.37 |
| Superplasticizer F2 | 0.0365 | 0.0365 |
| W/C ratio | 0.225 | 0.225 |

The results obtained are shown in the following Table 2.

TABLE 2

| Setting time (beginning) | 2 h 25 | 3 h 00 |
|---|---|---|
| Setting time (end) | 3 h 50 | 6 h 00 |
| Spread before shocks (mm) | 155 | 255 |
| Spread after shocks (mm) | 195 | 280 |
| Compressive strength at 48 h (1) | 110 MPa | 110 MPa |
| Compressive strength after thermal curing (2) | 150 MPa | 180 MPa |

(1) After moist curing for two days at 20° C., on a cylindrical test sample having a diameter of 7 cm and a height of 14 cm.
(2) After moist curing for two days at 20° C., and then moist curing for 2 days at 90° C. on a cylindrical test sample having a diameter of 7 cm and a height of 14 cm.

Example 3

A comparison was made, using the procedure described in Example 1, between a fibre-containing mixture and corresponding mixtures, whose compositions are given below, in which silica fume was replaced by the following:

| C800 (silica filler) |  |  | 100% |
|---|---|---|---|
| Durcal 1 (calcium carbonate filler) |  |  | 100% |
| C800 | 50% | Durcal 1 | 50% |
| C800 | 75% | Durcal 1 | 25% |

Each of the mixtures used contained 4% (by volume in relation to the volume of the mix) of polyvinyl alcohol (PVA) fibres (diameter 0.2 mm, length 12 mm).

|  | F0 | 100% C800 | 100% D1 | 50% C800-50% D1 | 75% C800-25% D1 |
|---|---|---|---|---|---|
| White cement | 1 | 1 | 1 | 1 | 1 |
| White FS MST | 0.3 |  |  |  |  |
| Siliceous filler C400 | 0.24 | 0.24 | 0.24 | 0.24 | 0.24 |
| Ultrafine limestone filler Durcal 1 |  | — | 0.35 | 0.17 | 0.09 |
| Ultrafine siliceous filler C800 |  | 0.34 | — | 0.17 | 0.26 |
| Sand Be01 | 1.43 | 1.43 | 1.43 | 1.43 | 1.43 |
| Superplasticizer F2 | 0.046 | 0.046 | 0.046 | 0.046 | 0.046 |
| Admixture A2 | 0.0175 | 0.0175 | 0.0175 | 0.0175 | 0.0175 |
| PVA fibres 12 mm | 0.079 | 0.079 | 0.079 | 0.079 | 0.079 |
| W/C ratio | 0.26 | 0.26 | 0.26 | 0.26 | 0.26 |

The results obtained are shown in the following Table 3.

TABLE 3

| | | | | | |
|---|---|---|---|---|---|
| Setting time (beginning) | 8 h 00 | 4 h 00 | 3 h 25 | — | — |
| Setting time (end) | 15 h 00 | 6 h 30 | 6 h 25 | — | — |
| Spread before shocks (mm) | 140 | 130 | 140 | 120 | 125 |
| Spread after shocks (mm) | 230 | 180 | 200 | 175 | 190 |
| Compressive strength at 48 h (1) | 79 MPa | 80 MPa | 79 MPa | 80 MPa | 80 MPa |
| Compressive strength after thermal curing (2) | 166 MPa | 160 MPa | 120 MPa | 150 MPa | 167 MPa |

(1) After moist curing for two days at 20° C., on a cylindrical test sample having a diameter of 7 cm and a height of 14 cm.
(2) After moist curing for two days at 20° C., and then moist curing for 2 days at 90° C. on a cylindrical test sample having a diameter of 7 cm and a height of 14 cm.

Example 4

The following materials were used.

| | |
|---|---|
| Cement HTS | 1 |
| Ultrafine limestone filler Durcal 1 | 0.2 |
| Limestone filler Durcal 5 | 0.2 |
| Sand Be01 | 1.37 |
| Kelco-Crete K400 | 0.00005 |
| Superplasticizer F2 | 0.04 |
| W/C ratio | 0.2 |

The powders and the concrete mixtures were prepared in a Rayneri mixer. Setting times, spread values, and compressive and flexural strengths (at 48 h and after thermal curing) were measured. The results obtained are shown in the following Table 4.

TABLE 4

| | |
|---|---|
| Setting time (beginning) | 8 h 00 |
| Setting time (end) | 12 h 30 |
| Spread before shocks (mm) | 230 |
| Spread after shocks (mm) | 255 |
| Compressive strength at 48 h (1) in MPa | 93.6 |
| Flexural strength at 48 h (3) in MPa | 12.3 |
| Compressive strength after thermal curing (2) in MPa | 153 |
| Flexural strength after thermal curing (4) in MPa | 16.3 |

(1) After moist curing for two days at 20° C., on a cylindrical test sample having a diameter of 7 cm and a height of 14 cm.
(2) After moist curing for two days at 20° C., and then moist curing for 2 days at 90° C. on a cylindrical test sample having a diameter of 7 cm and a height of 14 cm.
(3) After moist curing for two days at 20° C., on a prism-shaped test sample (4 × 4 × 16 cm).
(4) After moist curing for two days at 20° C., and then moist curing for 2 days at 90° C. on a prism-shaped test sample (4 × 4 × 16 cm).

Example 5

The following materials were used.

| | |
|---|---|
| Cement HTS | 1 |
| Ultrafine limestone filler Durcal 1 | 0.2 |
| Limestone filler Durcal 5 | 0.2 |
| Sand Be01 | 1.37 |
| Kelco Crete K400 | 0.00007 |
| Superplasticizer F2 | 0.04 |
| Metallic fibres | 0.19 |
| W/C ratio | 0.2 |

The powders and the concrete mixtures were prepared in a Rayneri mixer. Setting times, spread values and compressive and flexural strengths were measured. The results obtained are shown in the following Table 5.

TABLE 5

| | |
|---|---|
| Setting time (beginning) | 8 h 00 |
| Setting time (end) | 11 h 00 |
| Spread before shocks (mm) | 180 |
| Spread after shocks (mm) | 215 |
| Compressive strength at 48 h (1) in MPa | 101 |
| Compressive strength after thermal curing (2) in MPa | 149 |
| Flexural strength after thermal curing (4) in MPa | 25.6 |

(1), (2) and (4): curing and samples were as described in Example 1.

Example 6

The following materials were used.

| | 10% Socal P2 | 30% Socal P2 | 10% Socal P3 | 30% Socal P3 |
|---|---|---|---|---|
| Cement HTS | 1 | 1 | 1 | 1 |
| Ultrafine limestone filler Durcal 1 | 0.18 | 0.14 | 0.18 | 0.14 |
| PCC Socal P2 | 0.02 | 0.06 | — | — |
| PCC Socal P3 | — | — | 0.02 | 0.06 |
| Limestone filler Durcal 5 | 0.2 | 0.2 | 0.2 | 0.2 |
| Sand Be01 | 1.37 | 1.37 | 1.37 | 1.37 |
| Superplasticizer F2 | 0.05 | 0.05 | 0.05 | 0.05 |
| W/C ratio | 0.2 | 0.2 | 0.2 | 0.2 |

The powders and the concrete mixtures were prepared in a Rayneri mixer. The results obtained are shown in the following Table 6.

TABLE 6

|  | 10% Socal P2 | 30% Socal P2 | 10% Socal P3 | 30% Socal P3 |
| --- | --- | --- | --- | --- |
| Setting time (beginning) | 10 h 00 | 9 h 30 | 9 h 30 | 9 h 00 |
| Setting time (end) | 15 h 00 | 14 h 00 | 14 h 00 | 15 h 00 |
| Spread before shocks (mm) | 245 | 245 | 255 | 240 |
| Spread after shocks (mm) | 270 | 270 | 280 | 265 |
| Compressive strength at 48 h (1) in MPa | 93.6 | 94.9 | — | — |
| Compressive strength after thermal curing (2) in MPa | 149 | 150 | 159 | 157 |
| Flexural strength after thermal curing (3) in MPa | 16.1 | 16.4 | 16.0 | 18.1 |

(1) After moist curing for two days at 20° C., on a cylindrical test sample having a diameter of 7 cm and a height of 14 cm.
(2) After moist curing for two days at 20° C., and then moist curing for 2 days at 90° C. on a cylindrical test sample having a diameter of 7 cm and a height of 14 cm.
(3) After moist curing for two days at 20° C., and then moist curing for 2 days at 90° C. on a prism-shaped test sample (4 × 4 × 16 cm).

The invention claimed is:

1. A concrete which comprises in parts by weight:
   100 of Portland cement;
   50 to 200 of a sand having a single grading with a D10 to D90 between 0.063 and 5 mm, or a mixture of sands, the finest sand having a D10 to D90 between 0.063 and 1 mm and the coarsest sand having a D10 to D90 between 1 and 4 mm;
   10 to 50 of a particulate, substantially non-pozzolanic material having a mean particle size less than 15 µm;
   0.1 to 10 of a water-reducing superplasticizer; and
   10 to 30 of water;
wherein the concrete is substantially free of silica fume; and wherein the concrete has a compressive strength greater than 100 Mpa at 28 days.

2. A concrete according to claim 1, comprising quicklime, burnt lime or calcium oxide.

3. A concrete according to claim 1, wherein the non-pozzolan comprises a ground limestone or ground quartz.

4. A concrete according to claim 1, comprising a ground limestone, ground quartz or a precipitated calcium carbonate or a mixture thereof.

5. A concrete according to claim 1, comprising organic or metal fibres.

6. A concrete according to claim 5, comprising 0.5 to 3.5% of metal fibres by volume relative to the volume of set cement.

7. A concrete according to claim 5, comprising 2 to 5% of organic fibres by volume relative to the volume of set cement.

8. A concrete according to claim 5, which has a compressive strength of more than 120 MPa.

9. A cement mixture comprising the materials specified in claim 1 and optionally calcined limestone or calcined dolomite but excluding water and, if it is liquid, superplasticizer.

10. A Method of using a particulate, substantially non-pozzolanic material having a mean particle size less than 15 µm to replace silica fume in the production of a concrete according to claim 1.

11. A concrete according to claim 6, which has a compressive strength of more than 120 Mpa.

12. A concrete according to claim 7, which has a compressive strength of more than 120 Mpa.

* * * * *